United States Patent [19]

Bowditch

[11] 4,382,159
[45] May 3, 1983

[54] BLOW ACTUATED MICROPHONE

[76] Inventor: Robert S. Bowditch, 1851 Campesino Pl., Oceanside, Calif. 92054

[21] Appl. No.: 268,364

[22] Filed: May 29, 1981

[51] Int. Cl.³ .................................. H04B 1/44
[52] U.S. Cl. ......................... 179/1 HF; 179/1 SW; 179/1 VC; 179/156 A; 455/79
[58] Field of Search ............ 179/1 SW, 1 VC, 1 HS, 179/1 HF, 156 A, 157, 187; 307/117, 118; 455/78, 79, 100

[56] References Cited

U.S. PATENT DOCUMENTS 1,170,882  2/1916  De Forest ........................... 455/79

*Primary Examiner*—G. Z. Rubinson
*Assistant Examiner*—James L. Dwyer
*Attorney, Agent, or Firm*—Thomas J. Tighe

[57] ABSTRACT

In acoustical sound processing equipment, a combination microphone and blow actuated keying and unkeying means. The speaking person blows a first time into a tube to key the processing equipment and blows a second time to unkey the equipment. The person also vocalizes into the tube. The tube is in fluid communication with a chamber which houses the microphone. A blow detector senses the blowing action and triggers a bistable flip-flop which in turn drives a keying relay.

6 Claims, 8 Drawing Figures

BLOW ACTUATED MICROPHONE

This invention relates generally to the microphones and keying means of sound processing devices and more specifically to the microphones and devices for keying the transmitters of citizen band and other mobile-type radios.

Voice actuated (VOX) keying devices have been presented in the past. (The terms "key" and "keying" as used in this specification refer, respectively, to an actuating means and the act of actuating sound processing equipment, and are well known in the pertinent art.) They are used in a variety of systems to switch on transmitters and recording devices, such as the phone answering devices. The voice actuated devices presented worked very well in a low-noise environment where the power of the background noise at the microphone is significantly less than the power emitted by the human voice. If the background noise level approaches the level of the voice from the speaker then the transmitter is keyed at inappropriate times. Such a high background noise environment might exist in the case of a citizens band radio transmitter in an automobile or the cab of a truck where the microphone would encounter engine noises, wind noises and noises from a radio receiver.

Sound-cancelling techniques have been employed to solve the problem of high-background noises. A microphone is arranged so that the background noise strikes the front and back of the diaphragm simultaneously and cancels itself out, whereas the voice strikes one side more effectively than the other and does not cancel. The primary drawback of such a system is that the microphone which picks up the voice and the background sound must be located precisely with respect to the mouth and usually touching or close to the lips of the speaker in order to precisely discriminate. This is extremely annoying to the speaker because the microphone is in constant contact or nearly so with his/her lips.

The method of keying the transmitter most often employed in high background noise environments is a hand- or finger-actuated key. In the operation of mobile radios in cars or trucks, it is desirable that the operator who is usually alone in the car/truck not be required to take his hands off the wheel or his eyes off the road to put the microphone in position in front of his mouth and then operate the keying switch. The act of holding the microphone with one hand and operating the keying switch with a finger or thumb can divert the eyes and attention of the driver from the road and potentially create a dangerous situation.

This invention presents a combination of a microphone and a blow-actuated keying device which can be hung about the neck or suspended from a headband or other means which overcomes the problems discussed above. (Unless otherwise indicated, the term "blow" in this specification shall indicate action by the speaker of expelling forcefully a current of air from his/her mouth for a momentary period of time.) It is immune to background noise regardless of the intensity and it requires no hand action in order to be actuated. Furthermore, it can be actuated without the necessity of diverting the operator's attention to the device as would be the case if the device was actuated by physical contact of the lips or other head movement.

No prior device known to me provides the combination of attributes of the present invention and other advantages and attributes will readily be seen by one of ordinary skill in the art.

SUMMARY OF THE INVENTION

This invention presents a combination of a wind-and-sound conduit, a microphone assembly and an electronic assembly for use in keying and unkeying radio transmitters and other audible sound-processing devices and for use as a microphone means for such devices. One end of the wind-and-sound conduit is in fluid communication with the microphone assembly and the other end is open to receive input from the mouth of the speaker. The inputs are in the form of voice sounds or forcefully moving air caused by the action of the speaker blowing into the conduit. The microphone assembly converts the inputs to electrical signals which are then sent to the electronic assembly. If the input is forcefully moving air, the electronic assembly either keys or unkeys any sound processing devices with which it is in electrical communication. If the input is voice sounds, the electrical signals representing the sounds are sent to the sound processing devices if they are in a keyed state.

The combination, as will be seen, can be packaged in a variety of ways which will be obvious to one of ordinary skill in the pertinent art. The only restriction is that the open end of the wind-and-sound conduit be positioned so that the speaker can conveniently speak and blow into the opening. The combination or portions of it can be mounted on a chest-plate which is suspended by a strap or chain around the neck of the speaker such that it is worn like a pendant. The combination or portions of it may also be suspended by a headband or other suitable means.

The major components of this invention as presented in the descriptions of the preferred embodiments are as follows: (1) a wind-and-sound conduit, (2) a plenum chamber, (3) a microphone, (4) a blow detector, (5) a relay driver, and (6) a keying relay.

In one embodiment the microphone assembly consists of a plenum chamber which is in fluid communication with the wind-and-sound conduit, a microphone which is located within the plenum in a position suitable to receive the sound, and a pressure actuated switch located beneath the plenum chamber. When the speaker blows into the wind-and-sound conduit the air pressure in the plenum chamber increases beyond that which is located outside of the chamber. A pressure-release orifice channels the increased chamber pressure out of the chamber and onto a movable contact of the pressure switch. When the pressure inside the chamber is at a suitable level, the movable contact is forced to touch a stationary contact of the pressure switch. The touching of the two switch contacts is communicated electrically through a cable to the electronic assembly. The electronic assembly contains a conventional solid state switch debouncing circuit, a bistable flip-flop, a relay driver and a keying relay. The switch debounce circuit eliminates the electrical noise associated with the opening and closing of mechanical contacts and produces one electrical pulse each time the pressure switch is actuated by a blow. The bistable flip-flop is a conventional flip-flop which can assume one of two stable states and which alternates between the two states in response to the pulses from the debounce circuit. When the pressure switch contacts are closed the bistable flip-flop is triggered and changes state. The changing of the flip-flop state is communicated to the relay driver and, depending on which state the bistable flip-flop assumes, the relay contacts are either moved to a position which keys the sound processing devices or moved to a position which unkeys the devices. In the above described embodiment, the blow detector consists of the pressure switch and the debounce circuit with a bistable output. In a second embodiment, the blow detector is a discriminator circuit with a substantially similar bistable output, and the other major components are functionally the same as in the first embodiment. The only substantial difference between the two embodiments is that, in the former, the power of the blow is detected mechanically, whereas in the latter, the power of the blow is detected electrically by the discriminator.

The discriminator uses a characteristic ability of conventional microphones to respond in an essentially linear fashion to sound pressures considerably above those generated by normal voice levels and background noises. A blow into the wind-and-sound conduit instantaneously produces a volume of high pressure air which traverses the length of the conduit essentially undiminished. The microphone is suitably disposed in the plenum chamber to not only receive sounds from the conduit but also to receive the impact of the pressure front as it enters the chamber. The pressure front applies an impulse function-like force on the microphone which causes second and higher order vibrations in the microphone elements. The voltage levels of the electrical signals from the microphone due to such vibrations are typically five (5) times higher than voice and background noise levels.

The discriminator takes all of the varying signals from the microphone, amplifies them to a usable level, rectifies them, and filters them to produce a direct current (dc) voltage level which represents the magnitude of the signals from the microphone. The dc voltage level is then compared with an adjustable reference level which is set suitably below the levels produced by typical blows. When the dc voltage level is higher than the reference, a bistable flip-flop is triggered and changes state. The changing of the state of the flip-flop is communicated to the relay driver and, as previously described, the relay contacts change positions.

An object of this invention is to provide a means of keying sound processing devices without the necessity of manual- or hand-intervention.

It is also an object of this invention to provide a means of actuating or keying sound processing devices similar to that of voice actuated devices but which is immune to relatively high noises.

It is another object of this invention to provide a microphone and keying means for mobile radios, such as those located in cars, trucks and other motor vehicles, which does not require that the driver divert his/her attention from the operation of the vehicle.

Other objects will be apparent upon a reading of the detailed description of the preferred embodiment.

DESCRIPTION OF THE PREFERRED EMBODIMENT

Figure 1:
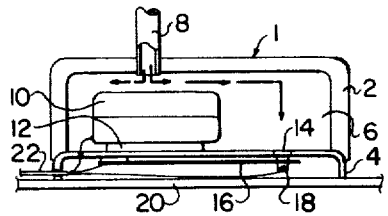
FIG. 1 is a diagrammatical view of the microphone assembly of a first embodiment with portions of the cover and base of the plenum chamber cut away so as to expose the microphone and the pressure switch.
Figure 3:
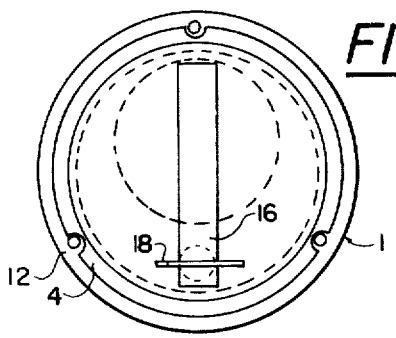
FIG. 3 is a bottom plan view of the microphone assembly of FIG. 1 showing the pressure switch.

Referring to FIGS. 1 and 3, the microphone assembly is designated in general as 1. A cup-like cover 2, is shown connected to an inverted dish-like base or bottom 4 forming a plenum chamber 6. A wind-and-sound conduit 8, is in fluid communication with the plenum chamber 6. A microphone 10, is disposed within the plenum chamber 6 so as to receive the sound coming from the wind-and-sound conduit 8. The microphone 10 is attached to the chamber bottom 4 by a foam pad 12 with adhesive on both sides. The plenum chamber 6 is entirely closed except for the sound-and-wind conduit 8 and a pressure release orifice 14. The pressure release orifice 14 directs any air under pressure in the plenum chamber 6 against a movable contact 16 of a pressure switch and when the pressure is at a suitable level, the movable contact 16 will touch a stationary contact 18. The contacts 16, 18 of the pressure switch and the microphone 10 are in electrical communication with an electronic assembly by means of cable 22. The base 4 of the microphone assembly 1 is affixed to a chest-plate 20.

Figure 2:
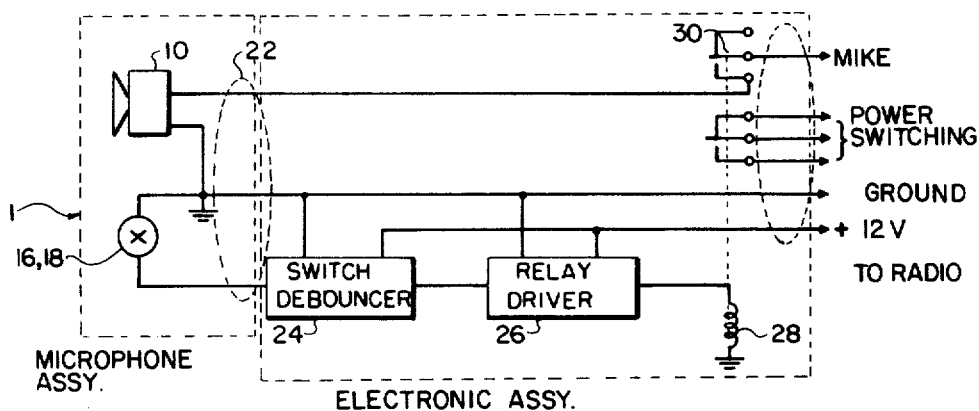
FIG. 2 is schematical representation of the microphone assembly and electronic assembly of a first embodiment.

Referring to FIG. 2, the switch debouncer 24 is shown in electrical communication with pressure switch contacts 16, 18. The switch debouncer 24 uses conventional techniques to eliminate electrical contact bounce and provides a bistable output due to a flip-flop within the switch debouncer 24. The switch debouncer 24 is in electrical communication with a relay driver 26. The relay driver 26 is a conventional power amplifier which responds to the presence or absence of a signal from the switch debouncer 24. The relay driver 26 is in electrical communication with relay 28 which in turn is mechanically connected to contacts 30. Thus, when the bistable flip-flop within the switch debouncer 24 is in a first state, the relay driver 26 provides current to the relay 28 and contacts 30 are moved from their normally closed position to a position where the sound processing device, such as a radio transmitter, is keyed. When the bistable flip-flop within the switch debouncer 24 is in a second state, the relay 28 is undriven and contacts 30 go back to their normally closed position and the transmitter is unkeyed.

Figure 4:
FIG. 4 shows the invention worn on the chest of a person in the act of blowing into the wind-and-sound conduit.
Figure 5:
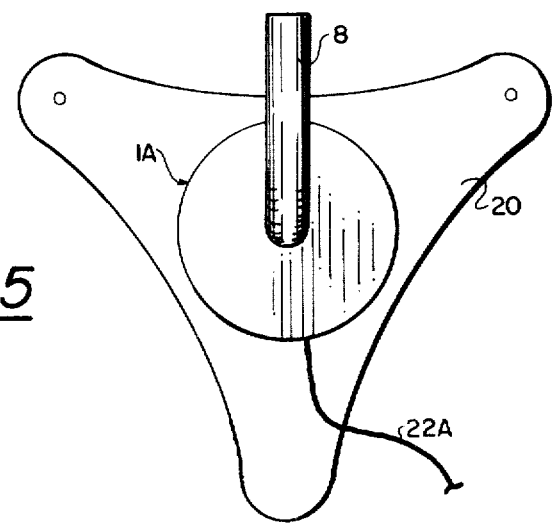
FIG. 5 is a top-view of the invention as shown in FIG. 4.

Referring to FIGS. 4 and 5, the invention is shown mounted on a chest-plate 20 and worn pendant fashion. A speaker is also shown to be blowing into the wind-and-sound conduit 8 in order to key or unkey any sound processing devices with which the invention is in electrical communication by means of the cable 22.

Figure 6:
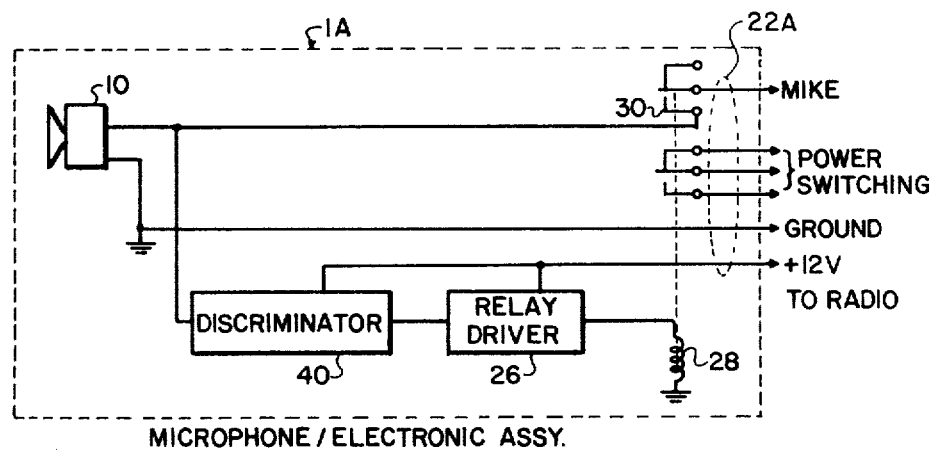
FIG. 6 is a schematical representation of a second embodiment showing a combined microphone/electronic assembly.
Figure 7:
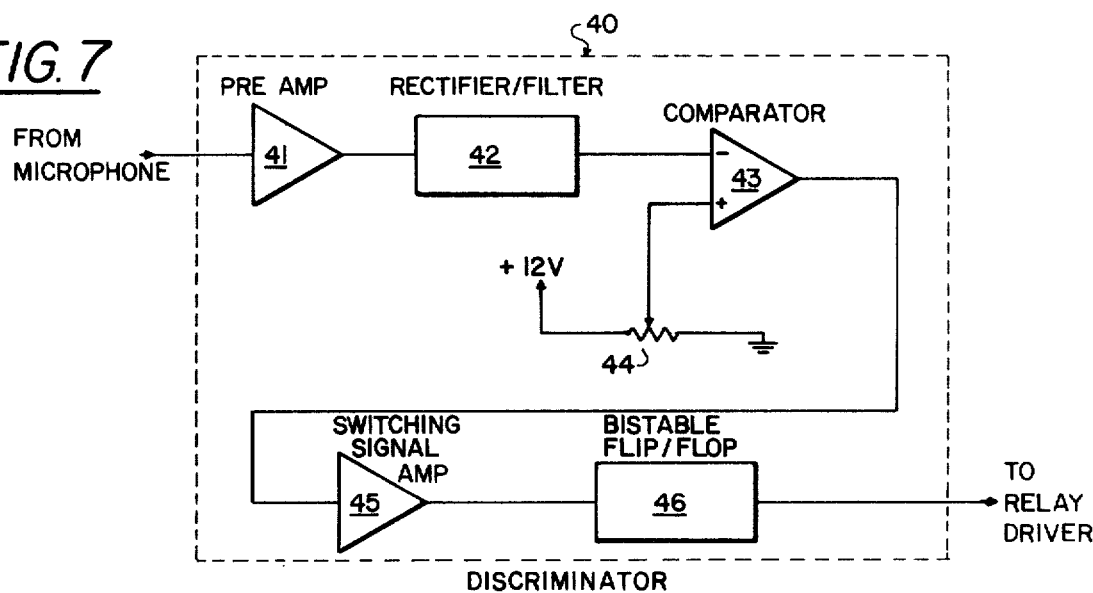
FIG. 7 is a functional diagram showing the discriminator in more detail.

Referring to FIGS. 6 and 7, a second embodiment of the invention is shown. In this embodiment, the microphone and electronic parts are packaged into one assembly, generally deisgnated 1A, which is disposed within the plenum chamber and in electrical communication with the sound processing devices by means of a cable 22A. As can be seen, the only functional difference between the first and second embodiments is that the pressure switch contacts 16 and 18 and the switch debouncer 24 has been replaced by a discriminator 40.

The discriminator 40 is shown to contain a pre-amplifier 41, a rectifier/filter circuit 42, a comparator 43 with an adjustible voltage reference 44, a switching signal amplifier 45, and a bistable flip-flop 46. The pre-amplifier 41 linearly amplifies the low level varying signals from the microphone 10 to levels suitable to the rectifier/filter circuit 42. The circuit 42 half-wave rectifies the varying signals from the pre-amplifier 41 and converts them to a substantially dc voltage level by means of a low pass filter. A voltage level comparator 43 is used to compare the dc voltage level from the rectifier/filter circuit 42 with the voltage level of the reference 44. The reference 44 is a conventional potentiometer tied between two suitable electrical potentials (in this case, +12 V and ground) with the reference voltage taken from the adjustable tap. A switching signal amplifier 45 is optionally provided to boost the output of the comparator 43 to levels suitable to the flip-flop 46. The operational relationship of the other major components of this embodiment is identical to that of the first embodiment as previously discussed.

Figure 8:
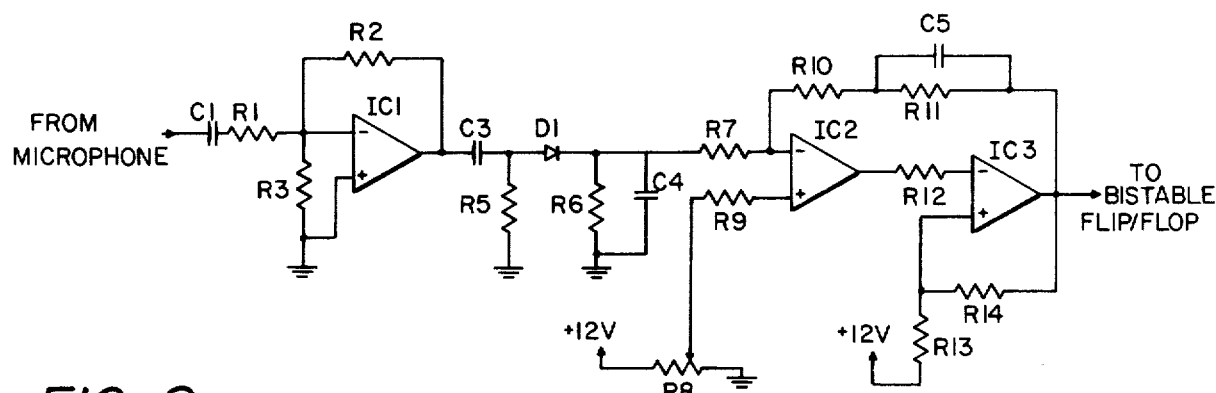
FIG. 8 is a detailed circuit diagram of one embodiment of the discriminator.

A discussion of FIG. 8 will show that the active elements of the discriminator 40 can be constructed using only a single monolithic integrated circuit. The three amplifiers, IC1, IC2, and IC3, are each part of an LM 3900 which is a typical monolithic integrated circuit containing four (4) distinct operational amplifiers. IC1 and associated circuitry function as the pre-amplifier 41. A diode D1 provides the half-wave rectification and a resistor R6 and a capacitor C4 provide the low pass filtering of the rectifier/filter circuit 42. IC2 functions as the comparator 43 and IC3 functions as the switching signal amplifier 45. The positive feedback from the output of IC3 to the negative input of IC2 through two feedback resistors R10 and R11 and a bypass capacitor C5 provide the hysteresis which enables IC2 to function as a comparator. The reference 44 is provided by a potentiometer R8. An advantage of this embodiment is that the fourth amplifier of the LM 3900 can be used as the relay driver 26. The functions of the other unmentioned components of FIG. 8 will be obvious to one skilled in the pertinent art.

The typical operation of the invention begins with a desire on the part of the speaker to key a sound processing device such as a radio transmitter. To do so, the speaker blows into the end of the tube in front of his mouth, the wind-and-sound conduit. The blow creates a volume of high pressure air which moves rapidly down the conduit and enters the plenum chamber. In the first embodiment, the pressurized air is channeled out of the chamber where it is detected by the pressure switch and switch debounce circuit and the relay is energized. In the second embodiment, the pressurized air hits the microhphone and sets up second and higher order vibrations which are detected by the discriminator and the relay is energized. Once energized, the relay contacts move to a positon which turns "on" the transmitter. The speaker then transmits his message using the wind-and-sound conduit to channel his voice sounds to the microphone. When he is finished, the speaker again blows into the conduit. The blow is once again detected and causes the output of the switch debouncer or the discriminator to change states which in turn de-energizes the relay and turns "off" the transmitter.

The foregoing detailed descriptions were given primarily for clarity of understanding and no unnecessary limitations should be understood therefrom, for other modifications will be obvious to those skilled in the art and may be made without departing from the spirit of the invention or the scope of the appended claims.

I claim:

1. In an acoustical sound processing device a combination microphone means and blow actuated keying and unkeying means comprising:
   (a) a plenum chamber defining a pressure release orifice,
   (b) a conduit means in fluid communication with the chamber means, the conduit means having an open end to permit a speaker to vocalize and blow into the conduit means,
   (c) a blow detector means with two stable output states, a first and second, adapted to alternate between said states in response to blows of suitable strength which are directed into the conduit means such that for each distinct momentary blow, the output of the blow detector means changes state only once,
   (d) a means for keying and unkeying the sound processing device when the output of the blow detector means is in the first and second states respectively,
   (e) a transducer means disposed within the plenum chamber for converting acoustic vibrations to a corresponding varying electrical signal, the transducer means being in electrical communication with the sound processing device for the primary purpose of sending said signal to said device.

2. The combination of claim 1 wherein the blow detector comprises:
   (a) a switching means adapted to momentarily actuate when a speaker blows into the conduit means,
   (b) a pulse generating means which electrically senses the actuation of the switching means and which produces an electrical pulse in response to said actuation, and
   (c) a bistable flip-flop means which changes the state of its output in response to the electrical pulse.

3. The combination of claim 2 wherein the switching means is a pressure actuated switch disposed outside of the plenum chamber but in close proximity to the pressure release orifice such that when pressurized air in the chamber caused by a blow is being released from the chamber by the orifice, the released air exerts pressure on the switch.

4. The combination of claim 1 wherein the blow detector comprises:
   (a) an amplifying means for amplifying the transducer electrical signals to a suitable level,
   (b) means for producing a generally dc voltage substantially corresponding to the magnitude of the amplified transducer signal,
   (c) a suitable dc voltage reference,
   (d) means for comparing the dc reference voltage and the produced dc voltage, said means being adapted to output an electrical pulse when the produced voltage momentarily exceeds the reference voltage as when a speaker momentarily blows into the conduit means, and
   (e) a bistable flip-flop means which changes the state of its output in response to the electrical pulse.

5. The combination of claim 4 wherein the dc voltage producing means comprises:
(a) a signal rectifying means, and
(b) a low pass filter means.

6. The combination of claims 2 or 4 wherein the keying and unkeying means comprises:
(a) a relay means with a set of electrical contacts, the state of said contacts being determinative of the state, keyed or unkeyed, of the sound producing device, and
(b) an amplifier means for electrically energizing the relay means.

* * * * *